US009662806B2

United States Patent
Fujii et al.

(10) Patent No.: US 9,662,806 B2
(45) Date of Patent: May 30, 2017

(54) KNEADING DEVICE

(71) Applicant: JTEKT CORPORATION, Osaka-shi (JP)

(72) Inventors: Takafumi Fujii, Okazaki (JP); Masaru Fuse, Kashihara (JP); Takumi Mio, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 181 days.

(21) Appl. No.: 14/628,863

(22) Filed: Feb. 23, 2015

(65) Prior Publication Data
US 2015/0239151 A1    Aug. 27, 2015

(30) Foreign Application Priority Data

Feb. 26, 2014  (JP) ................................ 2014-035749

(51) Int. Cl.
*B29B 7/38*  (2006.01)
*B29B 7/60*  (2006.01)
(Continued)

(52) U.S. Cl.
CPC ............. *B29B 7/38* (2013.01); *B01F 3/1221* (2013.01); *B01F 3/1271* (2013.01); *B01F 3/20* (2013.01);
(Continued)

(58) Field of Classification Search
CPC ...... B01F 3/1271; B01F 3/20; B01F 7/00825; B01F 7/00833; B01F 7/081;
(Continued)

(56) References Cited

U.S. PATENT DOCUMENTS 2,817,500 A * 12/1957 Robinson .............. B01F 5/0665
                                                       137/503
2,982,990 A *  5/1961 Zomlefer ................ B29B 7/427
                                                       366/145
(Continued)

FOREIGN PATENT DOCUMENTS

DE   10 2011 077 130 A1  12/2012
EP       0 735 093 A1    10/1996
(Continued)

OTHER PUBLICATIONS

Extended European Search Report issued May 20, 2014 in European Patent Application No. 14154089.8.
(Continued)

*Primary Examiner* — Tony G Soohoo
(74) *Attorney, Agent, or Firm* — Oblon, McClelland, Maier & Neustadt, L.L.P.

(57) ABSTRACT

A kneading device includes: a preliminary kneading device that produces a preslurry by agitating a powder and a liquid introduced and transferring them while wetting the powder with the liquid; and a main kneading device that causes the powder to be uniformly dispersed in the preslurry supplied from the preliminary kneading device to produce a slurry. The main kneading device includes a gap defined by two conical surfaces that face each other with a predetermined distance therebetween and rotate relative to each other about their central axes. The slurry is produced by passing the preslurry through the gap. With the preliminary kneading device, the powder is dispersed in the liquid after conforming to the liquid, which suppress damage to the powder. The conditions of main kneading can be changed only by adjusting the gap, which facilitates the operation of changing the conditions of the main kneading.

15 Claims, 4 Drawing Sheets

(51) Int. Cl.
| | |
|---|---|
| *B29B 7/46* | (2006.01) |
| *B01F 11/02* | (2006.01) |
| *B01F 7/00* | (2006.01) |
| *B01F 7/08* | (2006.01) |
| *B01F 13/10* | (2006.01) |
| *B01F 15/00* | (2006.01) |
| *B01F 15/02* | (2006.01) |
| *H01M 4/04* | (2006.01) |
| *B01F 3/12* | (2006.01) |
| *B01F 3/20* | (2006.01) |

(52) U.S. Cl.
CPC ...... *B01F 7/00825* (2013.01); *B01F 7/00833* (2013.01); *B01F 7/081* (2013.01); *B01F 11/0266* (2013.01); *B01F 13/1027* (2013.01); *B01F 15/00162* (2013.01); *B01F 15/00253* (2013.01); *B01F 15/0298* (2013.01); *B29B 7/46* (2013.01); *B29B 7/60* (2013.01); *H01M 4/043* (2013.01); *B01F 2003/1257* (2013.01)

(58) Field of Classification Search
CPC .............. B01F 11/0266; B01F 15/0298; B01F 13/1027; B01F 15/00253; B01F 15/00162; B01F 2003/1257; B29B 7/46; B29B 7/38; B29B 7/60
USPC ..................................................... 366/83, 97
See application file for complete search history.

(56) References Cited

U.S. PATENT DOCUMENTS

| | | | | |
|---|---|---|---|---|
| 3,054,143 A * | 9/1962 | Stenger | ............. | B29C 47/26 425/381 |
| 3,137,895 A * | 6/1964 | Kusch | ............. | B29C 47/14 366/83 |
| 3,535,737 A * | 10/1970 | Hendry | ............. | B29C 45/581 159/2.2 |
| 3,563,514 A * | 2/1971 | Shattuck | ............. | B29C 45/581 159/2.2 |
| 3,682,447 A * | 8/1972 | Zucker | ............. | B01F 7/02 366/157.1 |
| 3,766,848 A * | 10/1973 | French | ............. | B30B 9/18 100/117 |
| 4,490,046 A * | 12/1984 | Guibert | ............. | B01F 7/24 366/297 |
| 4,834,545 A * | 5/1989 | Inoue | ............. | B01F 7/00816 222/135 |
| 5,707,763 A | 1/1998 | Shimizu et al. | | |
| 5,902,042 A * | 5/1999 | Imaizumi | ............. | B01F 7/008 366/176.2 |
| 6,019,802 A | 2/2000 | Ishizuka et al. | | |
| 6,092,921 A * | 7/2000 | Wentinck | ............. | B01J 8/0278 252/373 |
| 6,562,936 B1 | 5/2003 | Hatono et al. | | |
| 8,313,051 B2 * | 11/2012 | Stall | ............. | B29B 7/94 241/21 |
| 2004/0159971 A1* | 8/2004 | Kirjavainen | ............. | B29C 47/56 264/211 |
| 2004/0173439 A1* | 9/2004 | Abdel-Hadi | ............. | B01F 7/0005 198/659 |
| 2006/0245294 A1* | 11/2006 | Burkhardt | ............. | B29B 7/487 366/85 |
| 2009/0117461 A1 | 5/2009 | Shembel et al. | | |
| 2010/0230641 A1 | 9/2010 | Oki et al. | | |
| 2012/0135291 A1 | 5/2012 | Patoux et al. | | |
| 2012/0305685 A1 | 12/2012 | Yamamoto et al. | | |
| 2014/0225043 A1 | 8/2014 | Mio et al. | | |
| 2015/0239151 A1* | 8/2015 | Fujii | ............. | B29B 7/38 366/83 |

FOREIGN PATENT DOCUMENTS

| | | |
|---|---|---|
| GB | 818489 A | 8/1959 |
| JP | 01-083192 U | 6/1989 |
| JP | 11-090212 A | 4/1999 |
| JP | 2000-306598 A | 11/2000 |
| JP | 2001-328813 A | 11/2001 |
| JP | 2005-276502 A | 10/2005 |
| JP | 2006-310120 A | 11/2006 |
| JP | 2008-034377 A | 2/2008 |
| JP | 4104645 B2 | 6/2008 |
| JP | 2011-228062 A | 11/2011 |
| JP | 4941692 B2 | 5/2012 |
| JP | 2013-011594 A | 1/2013 |
| WO | WO 2004/011131 A2 | 2/2004 |
| WO | WO 2007/126400 A1 | 11/2007 |
| WO | WO 2011/001848 A1 | 1/2011 |
| WO | WO 2014/016921 A1 | 1/2014 |

OTHER PUBLICATIONS

U.S. Appl. No. 14/851,264, filed Sep. 11, 2015, Mio, et al.
Extended European Search Report issued Jul. 15, 2015 in Patent Application No. 15156220.4.

* cited by examiner

KNEADING DEVICE

INCORPORATION BY REFERENCE

The disclosure of Japanese Patent Application No. 2014-035749 filed on Feb. 26, 2014 including the specification, drawings and abstract, is incorporated herein by reference in its entirety.

BACKGROUND OF THE INVENTION

1. Field of the Invention

The invention relates to a kneading device that kneads a powder and a liquid.

2. Description of the Related Art

Recently, a lithium ion secondary battery has been used in a hybrid vehicle, an electric vehicle or the like. Each of electrodes in the lithium ion secondary battery is produced by kneading a powder of an active material (active substance) and the like in a solution of a thickener to produce a slurry of an active material, applying the produced slurry to a base material such as an aluminum foil, and drying the slurry.

The degree of dissolution of the thickener in the liquid solvent is important for performance of the secondary battery. The ratio of the mass of solute dissolved in a specific amount of solvent to the solubility (a maximum mass of the solute that can be dissolved in the solvent) is defined as a dissolution rate to solubility to be used in the description below. As an example of the device applicable to the kneading device, Japanese Patent Application Publication No. H11-90212 A (JP H11-90212 A) describes a device including a rotor and a stator. In the device, the rotor and the stator each have a stepped portion, and the stepped portions face each other. The stepped portions each extend radially outward in a concentric manner with a gradient in a radial direction. In the device, kneading can be carried out between the rotating rotor and the stator. Japanese Utility Model Application Publication No. H1-83192 U (JP H1-83192 U) describes a device including a pair of screws arranged side by side with their respective axes being parallel to each other. In the device, kneading can be carried out between the pair of rotating screws.

Japanese Patent Application Publication No. 2013-11594 (JP 2013-11594 A) describes a device including a pestle member and a mortar member. The pestle member has a distal-end outer periphery formed in a truncated-cone shape. The mortar member has a distal-end inner periphery that can contact the distal-end outer periphery of the pestle member and that is formed in a truncated-cone shape. The pestle member can be inserted in the mortar member. In the device, kneading can be carried out between the distal-end outer periphery of the rotating pestle member and the distal-end inner periphery of the mortar member.

The powder of the active material described above has low wettability with respect to the solution of the thickener. Thus, when the thickener, the solvent, the powder of the active material and the like are introduced at once and kneaded in the devices described in JP H11-90212 A, JP H1-83192 U, and JP 2013-11594 A, the powder of the active material may be damaged. In addition, demands for lithium ion secondary batteries have markedly increased, so it is desired to continuously perform the kneading. However, the devices described in JP H11-90212 A, JP H1-83192 U, and JP 2013-11594 A are devices for batch processing in which the thickener, the solvent, the powder of the active material and the like are introduced at once and kneaded. Therefore, it is difficult to use the devices in the continuous processing.

The device described in JP H11-90212 A is a device for kneading a hydrophobic liquid and a hydrophilic liquid between the rotating rotor and the stator so as to disperse the hydrophobic liquid in the hydrophilic liquid. Therefore, it is difficult to knead the powder of the active material having low wettability with respect to the solution of the thickener. Also, in the device described in JP H1-83192 U, when kneading conditions are changed, that is, when the gap between the pair of screws is changed, it is necessary to replace the pair of screws, which makes the changeover operation cumbersome. In the device described in JP 2013-11594 A, when the kneading conditions are changed, that is, the gap between the distal-end outer periphery of the pestle member and the distal-end inner periphery of the mortar member is changed, it is necessary to replace the pestle member and the mortar member, which makes the changeover operation cumbersome.

SUMMARY OF THE INVENTION

An object of the invention is to provide a kneading device that allows stable and continuous kneading of a powder and a liquid and for which kneading conditions can be easily changed.

A kneading device according to an aspect of the invention includes: a preliminary kneading device that produces a preslurry by agitating a powder and a liquid introduced and wetting the powder with the liquid during transferring the powder and the liquid; and a main kneading device that includes a gap defined by two conical surfaces facing each other with a predetermined distance provided therebetween and that produces a slurry by passing the preslurry supplied from the preliminary kneading device through the gap so that the powder is uniformly dispersed in the preslurry, the two conical surfaces rotating relative to each other around their respective central axes, the predetermined distance of the gap being adjustable.

Accordingly, the powder is dispersed in the liquid after conforming to the liquid by wetting. Therefore, it is possible to suppress damage to the powder. Also, the powder is dispersed in the transferred preslurry while the powder and the liquid are agitated to produce the preslurry. Therefore, it is possible to perform continuous kneading. Further, the conditions of the main kneading can be changed only by adjusting the gap between the conical surfaces that face each other and rotate relative to each other. This facilitates the operation of changing the conditions of the main kneading.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A kneading device according to an embodiment of the invention constitutes a device for producing electrodes (a positive electrode and a negative electrode) in, for example, a lithium ion secondary battery. Each of the electrodes in the lithium ion secondary battery is produced by applying a slurry of an active material to a base material such as an aluminum foil or a copper foil, and then drying the slurry. The kneading device according to the present embodiment is a device for producing a slurry of an active material.

Specific examples of the active material will be described. In the case of the positive electrode, a lithium-nickel oxide or the like (solid content) as an active material (active substance), N-methylpyrrolidone or the like (liquid content) as a solvent, acetylene black or the like as a conductive agent, and polyvinylidene fluoride or the like as a binder are used. In the case of the negative electrode, graphite or the like (solid content) as the active material, water (liquid content) as the solvent, carboxymethylcellulose or the like as a thickener, and a styrene-butadiene rubber (SBR), polyacrylic acid or the like as the binder are used.

Figure 1:
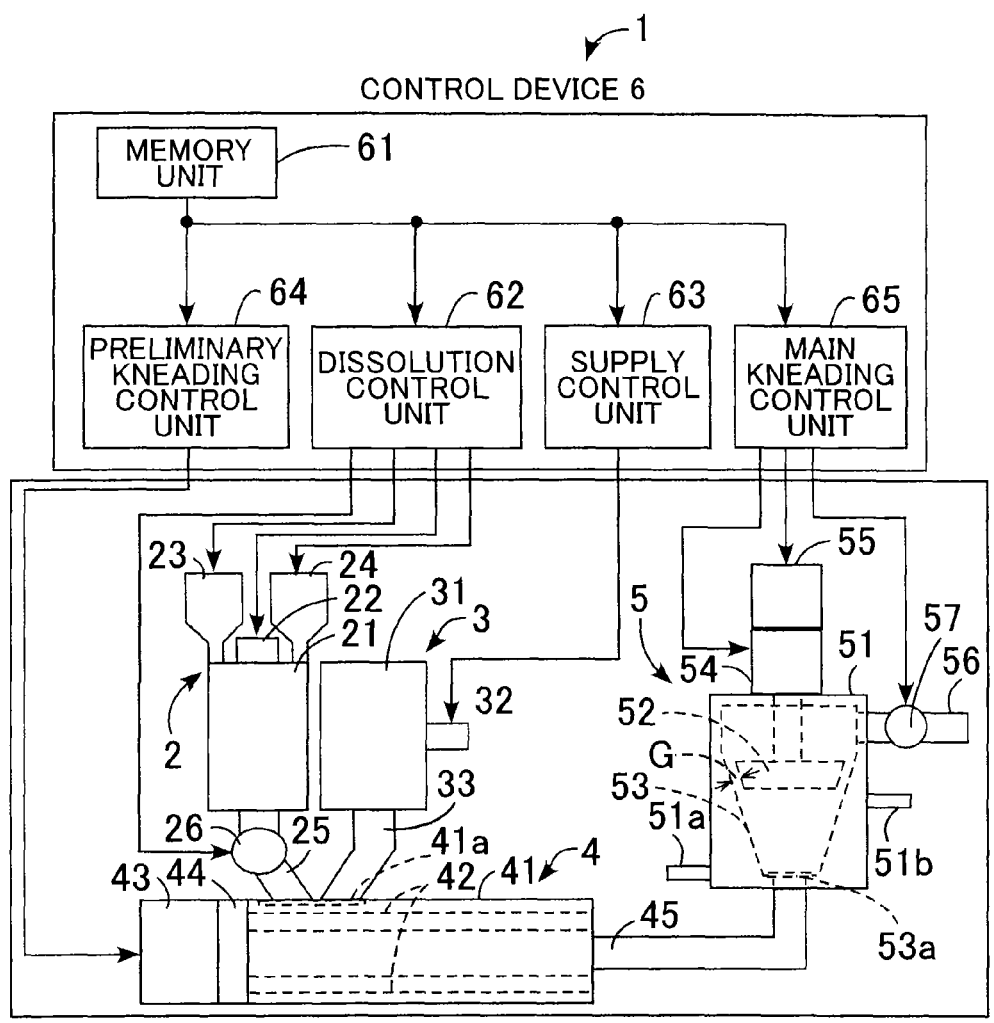
FIG. 1 is a schematic configuration diagram of a kneading device according to an embodiment of the invention.

The kneading device according to the present embodiment will be described with reference to FIG. 1. A kneading device 1 includes a dissolution device 2, a supply device 3, a preliminary kneading device 4, a main kneading device 5, a control device 6, and the like.

The dissolution device 2 is a device that dissolves a thickener in a solvent and supplies a predetermined amount of a solution containing the thickener to the preliminary kneading device 4. The dissolution device 2 includes a housing 21, a microwave device 22, a hopper 23, a reservoir tank 24, a supply pipe line 25, a metering pump 26, and the like. The housing 21 has a hollow cylindrical shape, and is disposed such that an axial direction of the housing 21 coincides with the vertical direction. The microwave device 22 includes a magnetron, and is disposed on an upper surface of the housing 21.

The hopper 23 that contains the thickener is provided to project from the upper surface of the housing 21 so that the thickener can be introduced into the housing 21. The reservoir tank 24 that contains the solvent is provided to project from the upper surface of the housing 21 so that the solvent can be introduced into the housing 21. The supply pipe line 25 is provided on a lower surface of the housing 21 so that the solution in which the thickener is dissolved in the solvent can be supplied to the preliminary kneading device 4. The metering pump 26 is provided at an intermediate part of the supply pipe line 25.

The supply device 3 is a device that supplies a predetermined amount of a powder of the active material to the preliminary kneading device 4. The supply device 3 includes a housing 31, a low-frequency wave generator 32, a supply pipe line 33, and the like. The housing 31 has a hollow cylindrical shape, and is disposed such that an axial direction of the housing 31 coincides with the vertical direction. The low-frequency wave generator 32 is a device that generates a low-frequency machine vibration and includes a solenoid as a vibration source. The low-frequency wave generator 32 is disposed on an outer periphery of the housing 31, and the solenoid is fixed to an outer peripheral surface of the housing 31. The supply pipe line 33 is provided on a lower surface of the housing 31 so that the powder of the active material can be supplied to the preliminary kneading device 4.

The preliminary kneading device 4 is a device for producing a preslurry of the active material, namely, a slurry in which the powder of the active material is dispersed in the solution of the thickener but the degree of dispersion is low, by wetting the powder of the active material with the solution of the thickener in the preliminary kneading device 4 during transferring the powder of the active material and the solution of the thickener. The preliminary kneading device 4 includes a housing 41, a pair of screws 42, a drive motor 43, a gear mechanism 44, a supply pipe line 45, and the like. The housing 41 has a generally hollow cylindrical shape, and is disposed such that an axial direction of the housing 41 coincides with the horizontal direction. An upper portion of a first end surface side of the housing 41 is provided with an opening 41a to which respective discharge openings of the supply pipe line 25 of the dissolution device 2 and the supply pipe line 33 of the supply device 3 are connected.

The pair of screws 42 is arranged side by side in the housing 41 so as to be parallel to each other. The pair of screws 42 is engaged with each other. Respective rotary shafts of the pair of screws 42 are supported on both end surfaces of the housing 41 so that the screws 42 can rotate in the opposite directions. The drive motor 43 is fixed to the first end surface of the housing 41, and a motor shaft of the drive motor 43 is coupled to respective rear ends of the rotary shafts of the screws 42 via the gear mechanism 44. The supply pipe line 45 is connected to a second end surface of the housing 41, that is, an end surface of the housing 41 on a front end side of the pair of screws 42 so that the preslurry of the active material can be supplied to the main kneading device 5.

The main kneading device 5 is a device for producing a slurry of the active material with a high degree of dispersion by uniformly dispersing the powder of the active material in the preslurry of the active material. The main kneading device 5 includes a housing 51, a rotor 52, a container 53, a moving motor 54, a rotary drive motor 55, a discharge pipe line 56, a valve 57, and the like. The housing 51 has a hollow cylindrical shape, and is disposed such that an axial direction of the housing 51 coincides with the vertical direction.

An outer peripheral surface of the housing 51 is provided with cooling pipe lines 51a and 51b for supplying and discharging a coolant that cools the container 53 disposed in the housing 51. The rotor 52 has a truncated-cone shape. An axial direction of the rotor 52 coincides with the vertical direction, and an end surface of the rotor 52 on the small-diameter side faces downward. A rotary shaft of the rotor 52 is supported at a central portion of an upper surface of the container 53. The rotor 52 is disposed so as to be rotatable about its axis within the container 53 and movable in the axial direction.

The container 53 includes a space having a truncated-cone shape. An inner peripheral surface of the container 53 is formed to be inclined at the same angle as an outer peripheral surface of the rotor 52, so that the container 53 can accommodate the rotor 52. The container 53 is disposed in the housing 51. An end surface of the container 53 on a small-diameter side is provided with an opening 53a. The supply pipe line 45 of the preliminary kneading device 4 passes through a lower part of the housing 51 and a discharge opening of the supply pipe line 45 is connected to the opening 53a. The moving motor 54 is fixed to an upper surface of an upper portion of the housing 51. The moving motor 54 is coupled to the rotary shaft of the rotor 52 via a gear mechanism (not shown).

The rotary drive motor 55 is fixed to an upper portion of the moving motor 54. The rotary drive motor 55 is coupled to the rotary shaft of the rotor 52 via a gear mechanism (not shown). The container 53 is provided, on its large-diameter side, with the discharge pipe line 56 passing through an outer peripheral surface of the housing 51 so that the slurry of the active material can be discharged to the outside of the main kneading device 5. The valve 57 is disposed at an intermediate portion of the discharge pipe line 56.

The control device 6 includes a memory unit 61, a dissolution control unit 62, a supply control unit 63, a preliminary kneading control unit 64, a main kneading control unit 65, and the like. The memory unit 61 stores data indicating a relationship between a dissolution rate to solubility and a viscosity of the solution in which the thickener is dissolved in the solvent (see FIG. 3), date indicating a relationship between a thickener dissolution time and a viscosity of the solution of the thickener (see FIG. 4), data indicating a relationship between a peripheral speed of the rotor 52 of the main kneading device 5 and a viscosity of the slurry of the active material (see FIG. 5), data indicating a relationship between an opening degree of the valve 57 of the main kneading device 5 and the viscosity of the slurry of the active material (see FIG. 6), and other data related to dissolution control, kneading control, and the like.

The dissolution control unit 62 is a control unit that controls the operation of the dissolution device 2. The dissolution control unit 62 drives the microwave device 22 so that the microwave device 22 generates microwaves. The microwaves are applied to the solvent in the housing 21, and thus, the thickener is dissolved in the solvent. The dissolution control unit 62 drives and controls the metering pump 26 so that a predetermined amount of the solution of the thickener is supplied to the preliminary kneading device 4 via the supply pipe line 25. The supply control unit 63 is a control unit that controls the operation of the supply device 3. The supply control unit 63 drives the low-frequency wave generator 32 so that the low-frequency wave generator 32 generates low-frequency waves to prevent clogging by the powder of the active material (bridges) in the housing 31. Thus, the supply device 3 supplies a predetermined amount of the powder of the active material to the preliminary kneading device 4 via the supply pipe line 33.

The preliminary kneading control unit 64 is a control unit that controls the operation of the preliminary kneading device 4. The preliminary kneading control unit 64 drives the drive motor 43 so that each of the pair of screws 42 rotates about its axis. The preliminary kneading device 4 produces the preslurry of the active material while wetting the powder of the active material with the solution of the thickener by agitating the solution of the thickener and the powder of the active material that are supplied from the opening 41a of the housing 41. The preliminary kneading device 4 transfers the preslurry of the active material from a screw rear-end side toward a screw front-end side, and supplies the preslurry to the main kneading device 5 via the supply pipe line 45.

The main kneading control unit 65 is a control unit that controls the operation of the main kneading device 5. The main kneading control unit 65 executes control for cooling the container 53 in the housing 51 by supplying the coolant from the cooling pipe line 51a and discharging the coolant from the cooling pipe line 51b, control for adjusting a gap G between the outer peripheral surface of the rotor 52 and the inner peripheral surface of the container 53 by driving the moving motor 54 to move the rotor 52 in the axial direction, and control for opening and closing the valve 57 provided at the intermediate portion of the discharge pipe line 56.

The control procedure of the main kneading control unit 65 is as follows. First, the valve 57 is closed. Then, the rotary drive motor 55 is driven to rotate the rotor 52 about its axis so that the preslurry of the active material supplied from the opening 53a of the container 53 passes through the gap G between the outer peripheral surface of the rotor 52 and the inner peripheral surface of the container 53. Accordingly, the powder of the active material is uniformly dispersed in the preslurry of the active material, and thus, the slurry of the active material is produced. When the container 53 is filled with the preslurry of the active material and the slurry of the active material and an internal pressure of the container 53 reaches a predetermined value, the valve 57 is opened by a predetermined amount and the slurry of the active material is discharged outside via the discharge pipe line 56.

Next, the process executed by the control device 6 will be described with reference to FIG. 2. The control device 6 drives the dissolution device 2 so that the thickener is dissolved in the solvent (step S1 in FIG. 2). Specifically, the dissolution control unit 62 reads from the memory unit 61 the data indicating the relationship between the dissolution rate to solubility and the viscosity for the solution of the thickener and the data indicating the relationship between the thickener dissolution time and the viscosity for the solution of the thickener.

The dissolution control unit 62 introduces a predetermined amount of the thickener into the housing 21 through the hopper 23, and introduces a predetermined amount of the solvent into the housing 21 through the reservoir tank 24. The dissolution control unit 62 drives the microwave device 22 so that microwaves are applied to the solvent in the housing 21. Thus, the thickener is dissolved. The dissolution control unit 62 drives the microwave device 22 until time Tg when the dissolution rate to solubility of the solution of the thickener reaches a predetermined value. When the dissolution rate to solubility reaches the predetermined value, the dissolution control unit 62 stops driving the microwave device 22.

Figure 3:
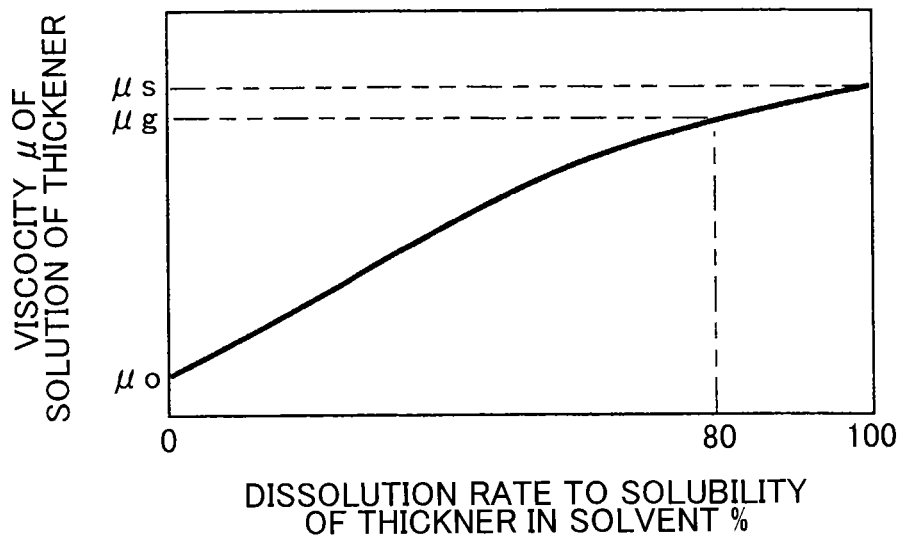
FIG. 3 is a graph showing a relationship between a viscosity of a solution of a thickener and a dissolution rate to solubility of a solution of a thickener.
Figure 4:
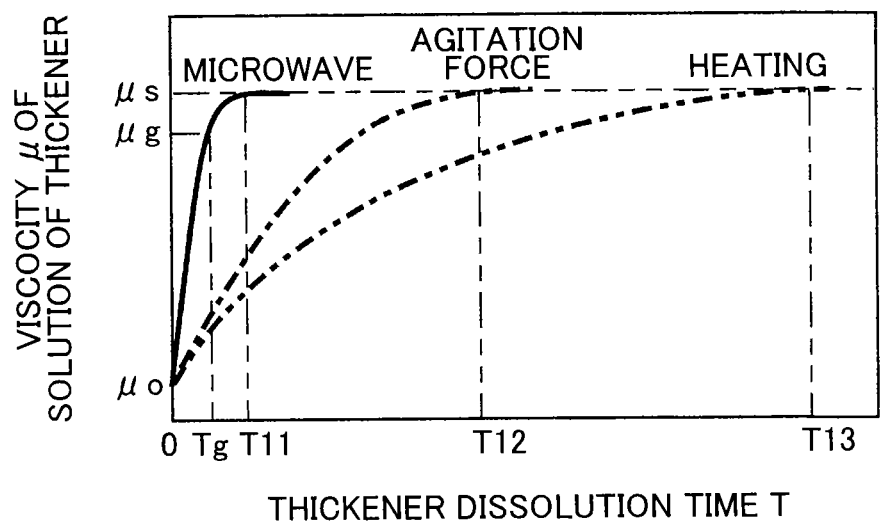
FIG. 4 is a graph showing a temporal change in the viscosity of the solution of the thickener caused by application of microwaves, a temporal change in the viscosity of the solution of the thickener caused by using agitation force, and a temporal change in the viscosity of the solution of the thickener caused by heating, in a step of dissolving the thickener.

The time Tg described above is calculated as follows. In the process of dissolving the thickener in the solvent, as shown in FIG. 3, a viscosity $\mu$ of the solution of the thickener is $\mu_o$ when the dissolution rate to solubility is 0%, that is, when the thickener has not been dissolved in the solvent immediately after the introduction of the thickener into the solvent. When the dissolution rate to solubility increases to 80%, the viscosity $\mu$ increases to $\mu_g$ ($>\mu_o$). When the dissolution rate to solubility reaches 100%, that is, when the thickener is completely dissolved in the solvent (a saturated state is achieved), the viscosity $\mu$ becomes $\mu_s$ ($>\mu_g$). In the case where the microwave device 22 is driven until the dissolution rate to solubility of the solution of the thickener reaches 80%, a driving time of the microwave device 22, namely, a thickener dissolution time T is Tg that is required for the viscosity $\mu$ of the solution of the thickener to increase from $\mu_o$ to reach to $\mu_g$, as shown in FIG. 4.

The dissolution with the use of the microwaves is performed by applying the microwaves to the solvent so that molecules of the solvent are vibrated and the solvent penetrates into the thickener. It is preferable that the frequency band of the microwaves should be a frequency band in which the molecules of the solvent can readily absorb the energy of the microwaves. Accordingly, in the case of using, for example, water as the solvent, a frequency band from 0.9 to 400 GHz is used.

Although the thickener may be dissolved in the solvent by agitation as in the conventional case, the molecules of the solvent are vibrated by the use of the microwaves so that the thickener is dissolved in the solvent in the present embodiment. This is because, as shown in FIG. 4, the thickener can be efficiently dissolved in the solvent with the use of the microwaves, as compared to the dissolution of the thickener in the solvent with the use of agitation force or the dissolution of the thickener by heating the solvent.

That is, in the case where the microwaves are used, the time T required for adjusting the viscosity of the solution of the thickener to a target viscosity μs, which is a target value, can be shortened to T11 (<T12<T13), while the time T is T12 in the case where agitation force is used, and the time T is T13 (>T12) in the case where heating is used. Thus, electric power required for dissolution with the use of the microwaves is lower than electric power required for dissolution with the use of the agitation force.

Figure 2:
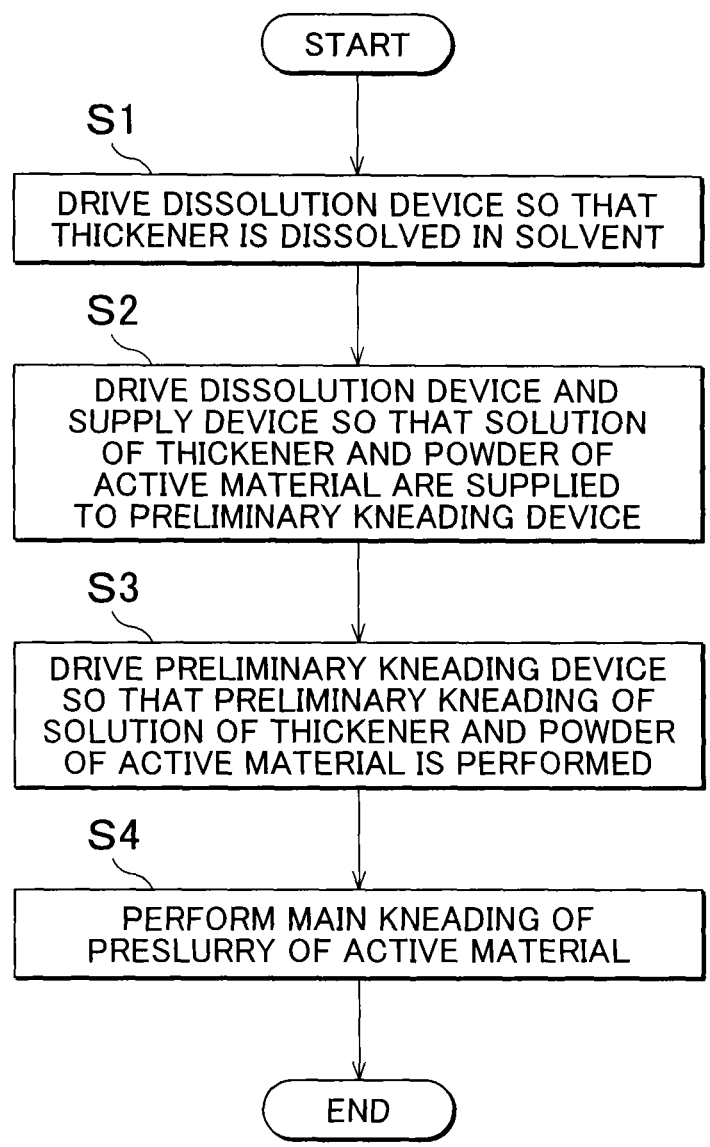
FIG. 2 is a flowchart showing the process executed by a control device of the kneading device according to the embodiment of the invention.

Next, the control device 6 drives the dissolution device 2 and the supply device 3 so that the predetermined amounts of the solution of the thickener and the powder of the active material and the like are supplied to the preliminary kneading device 4 (step S2 in FIG. 2). Specifically, the dissolution control unit 62 drives the metering pump 26 so that the predetermined amount of the solution of the thickener is supplied to the preliminary kneading device 4 at the rear end side of the pair of screws 42 through the supply pipe line 25. The supply control unit 63 drives the low-frequency wave generator 32 so that the predetermined amount of the powder of the active material and the like to the preliminary kneading device 4 at the rear end side of the pair of screws 42 through the supply pipe line 33.

Accordingly, the powder of the active material and the like is smoothly supplied to the preliminary kneading device 4 without occurrence of clogging (bridges). The powder of the active material and the like is kneaded with the solution of the thickener. Therefore, the powder of the active material and the like can be sufficiently wetted with the solution of the thickener, compared to the case where the active material, the thickener, and the solvent are kneaded together at a time.

Next, the control device 6 drives the preliminary kneading device 4 so that preliminary kneading of the solution of the thickener and the powder of the active material and the like is performed (step S3 in FIG. 2). Specifically, the preliminary kneading control unit 64 drives the drive motor 43 so that the pair of screws 42 rotates about their respective axes and the solution of the thickener and the powder of the active material supplied from the opening 41a of the housing 41 are mixed.

Accordingly, the powder of the active material and the solution of the thickener are transferred from the screw rear-end side toward the screw front-end side with the powder of the active material getting wet with the solution of the thickener. Thus, the preslurry of the active material is produced. Then, the preslurry of the active material is supplied to the main kneading device 5 via the supply pipe line 45. Thus, the solution of the thickener and the powder of the active material are extruded while being agitated by the pair of screws 42. Accordingly, the powder of the active material and the solution of the thickener can be transferred while the powder of the active material is sufficiently dispersed in the solution of the thickener.

Next, the control device 6 drives the main kneading device 5 so that the main kneading of the preslurry of the active material is performed (step S4 in FIG. 2). Specifically, the main kneading control unit 65 first performs the following preparation steps before the preslurry of the active material is supplied to the main kneading device 5. That is, the main kneading control unit 65 supplies the coolant from the cooling pipe line 51a and discharges the coolant from the cooling pipe line 51b in order to cool the container 53 in the housing 51. The container 53 is cooled in order to suppress an increase in temperature of the preslurry of the active material during the dispersion of the preslurry of the active material, which is performed in the gap G between the outer peripheral surface of the rotor 52 and the inner peripheral surface of the container 53 described later.

In addition, the main kneading control unit 65 drives the moving motor 54 to move the rotor 52 in the axial direction so that the gap G between the outer peripheral surface of the rotor 52 and the inner peripheral surface of the container 53 is adjusted and further, closes the valve 57. The reason why the gap G between the outer peripheral surface of the rotor 52 and the inner peripheral surface of the container 53 is adjusted and the reason why the valve 57 is closed will be described later.

Next, when the preslurry of the active material is supplied to the main kneading device 5, the main kneading control unit 65 drives the rotary drive motor 55 so that the rotor 52 rotates about its axis at a predetermined peripheral speed. The preslurry of the active material supplied from the opening 53a of the container 53 is subjected to a shearing force and a compression force when passing through the gap G between the outer peripheral surface of the rotor 52 and the inner peripheral surface of the container 53 so that the powder of the active material is dispersed in the preslurry of the active material. The shearing force has a function of shearing aggregates of the powder of the active material in the preslurry of the active material. The compression force has a function of impregnating the powder of the active material with the solution of the thickener in the preslurry of the active material.

Figure 5:
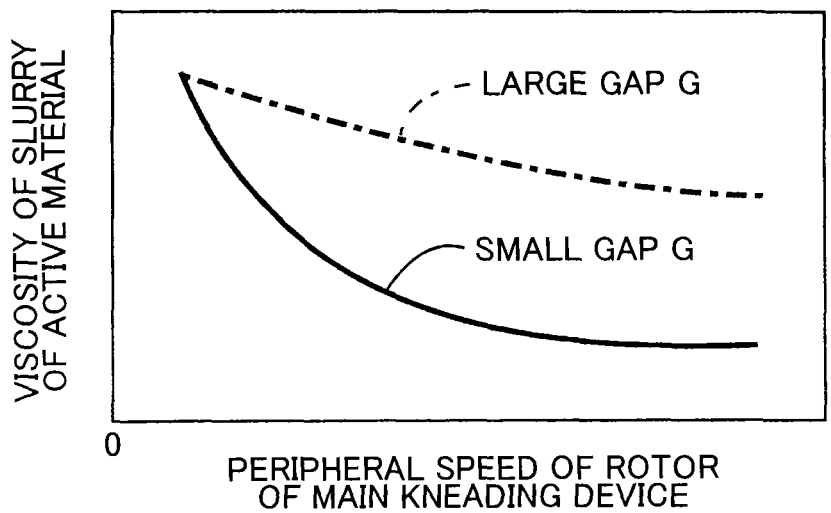
FIG. 5 is a graph showing a relationship between a peripheral speed of a rotor of a main kneading device and a viscosity of a slurry of an active material.

Here, the viscosity of the slurry of the active material must be adjusted within a predetermined range that is determined in view of the balance between the initial battery performance and the efficiency in performing the applying and drying steps. As shown in FIG. 5, the viscosity of the slurry of the active material decreases as the peripheral speed of the rotor 52 increases. Also, the smaller the gap G between the outer peripheral surface of the rotor 52 and the inner peripheral surface of the container 53, the larger the rate of decrease in the viscosity of the slurry of the active material. Thus, the peripheral speed of the rotor 52 and the gap G between the outer peripheral surface of the rotor 52 and the inner peripheral surface of the container 53 are set such that the viscosity of the slurry of the active material falls within the predetermined range.

Even if the main kneading is performed under the same conditions, the viscosity of the slurry of the active material often varies. This variation is attributable to a filling level of the preslurry of the active material and the slurry of the active material with respect to the volume of the container 53. That is, when the container 53 is poorly filled with the preslurry of the active material and the slurry of the active material, the transfer efficiency of energy from the rotor to the preslurry is low, so the viscosity of the slurry of the active material varies. In contrast, when the container 53 is sufficiently filled with the preslurry of the active material and the slurry of the active material, the transfer efficiency of energy from the rotor to the preslurry is high, so the viscosity of the slurry of the active material is stable. In order to sufficiently fill the container 53 with the preslurry of the active material and the slurry of the active material, it is only necessary to close the valve 57 and to continuously supply the preslurry of the active material.

When the container 53 is filled with the preslurry of the active material and the slurry of the active material, the container 53 can be maintained full by controlling an inflow pressure of the slurry of the active material and an outflow rate of the slurry of the active material. The inflow pressure of the preslurry of the active material is constant. Therefore, by controlling the outflow rate of the slurry of the active material through adjustment of the opening degree of the valve 57, the container 53 is maintained full.

Figure 6:
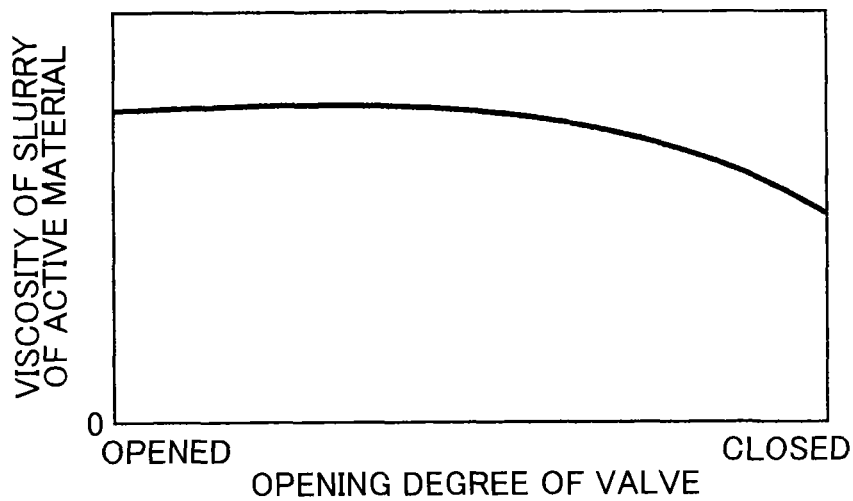
FIG. 6 is a graph showing a relationship between an opening degree of a valve of the main kneading device and the viscosity of the slurry of the active material.

As shown in FIG. 6, the viscosity of the slurry of the active material decreases as the opening degree of the valve 57 decreases. This is because as the opening degree of the valve 57 decreases, the shearing force acting on the preslurry of the active material increases in the gap G between the outer peripheral surface of the rotor 52 and the inner peripheral surface of the container 53. Thus, the opening degree of the valve 57 is set such that the viscosity of the slurry of the active material falls within the predetermined range described above. In addition, the speed and the pressure at which the preslurry of the active material passes through the gap G between the outer peripheral surface of the rotor 52 and the inner peripheral surface of the container 53 can be set with the opening degree of the valve 57. Thus, the opening degree of the valve 57 is adjusted such that the powder of the active material is sufficiently dispersed with respect to the solution of the thickener in the preslurry of the active material.

The main kneading control unit 65 measures the internal pressure of the container 53, which increases when the valve 57 is closed, with the use of a pressure gauge (not shown). When the container 53 is sufficiently filled with the preslurry of the active material and the slurry of the active material and the internal pressure of the container 53 reaches a predetermined value, the main kneading control unit 65 opens the valve 57 by a predetermined amount so that the slurry of the active material is discharged outside via the discharge pipe line 56.

In the kneading device 1 described above, the powder is dispersed in the liquid after conforming to the liquid in the preliminary kneading device 4. Therefore, it is possible to suppress damage to the powder. Also, because the powder is dispersed in the liquid while the powder and the liquid are transferred for producing the preslurry, it is possible to continuously perform kneading. Further, the conditions of the main kneading can be changed only by adjusting the gap G between the outer peripheral surface of the rotor 52 and the inner peripheral surface of the container 53 that face each other and rotate relative to each other. This facilitates the operation of changing the conditions of the main kneading.

Note that although the case of producing the active material for the negative electrode of lithium ion secondary battery is described in the above embodiment, the invention can be applied to the case of producing the active material for the positive electrode of the lithium ion secondary battery. In addition, materials to which the invention is applicable are not limited to the active material for electrodes of the lithium ion secondary battery. For example, the invention is applicable to materials for capacitors, slurry of fine particles for medical products or cosmetics, pastes for food, and the like.

What is claimed is:

1. A kneading device comprising:
    a preliminary kneader that produces a preslurry by agitating a powder and a liquid introduced therein and wetting the powder with the liquid while transferring the powder and the liquid;
    a main kneader that includes two conical surfaces facing each other with a predetermined distance provided therebetween to define a first gap, whereby a slurry is produced by passing the preslurry supplied from the preliminary kneader through the first gap so that the powder is uniformly dispersed in the preslurry, wherein at least one of the two conical surfaces is mounted for rotation about an axis of rotation, and at least one of two conical surfaces is mounted for movement in the direction of the axis of rotation, whereby the two conical surfaces are relatively rotatable about the axis of rotation and whereby the first gap between the two conical surfaces is adjustable;
    a slurry discharge passage connected to the main kneader for discharging the slurry from the main kneader;
    a valve provided for opening and closing the discharge passage;
    a pressure gauge provided to measure the pressure in the main kneader; and
    a controller operatively connected to the valve, which controller is configured to open and close the valve responsive to an input from the pressure gauge, such that a viscosity of the slurry is in a predetermined range.

2. The kneading device according to claim 1, wherein
    the preliminary kneader includes a pair of screws arranged side by side so as to be parallel to each other, engaged with each other, and rotatable about their respective axes, and
    the preliminary kneader is connected to a supply pipe line for introducing the powder and the liquid to the preliminary kneader at rear-end side of the screw, to wet the powder with the liquid during transferring the powder and the liquid toward front-end side of the screw by using rotation of the pair of screws so as to produce the preslurry.

3. The kneading device according to claim 2, wherein
    the main kneader includes: a rotor having a truncated-cone shape, being rotatable about its axis, and being movable in its axial direction; and a container which accommodates the rotor and is provided with an inner peripheral surface having a conical surface that inclines at the same angle as an outer peripheral surface of the rotor,
    wherein a second gap between the outer peripheral surface of the rotor and the inner peripheral surface of the container is adjustable by moving the rotor in the axial direction,
    wherein the preslurry supplied from the preliminary kneader to a space in the container on a first end-surface side of the rotor is caused to pass through the second gap, whereby the powder is caused to be uniformly dispersed in the preslurry by rotation of the rotor about its axis so as to produce the slurry, and whereby the slurry is extruded to a space in the container on a second end-surface side of the rotor to discharge the slurry outside the container.

4. The kneading device according to claim 3, further comprising:

a wave generator that applies vibration to the powder so as to supply the powder to the preliminary kneader.

5. The kneading device according to claim 3, further comprising:
a dissolution device that dissolves a thickener in a solvent, wherein
the preliminary kneader kneads at least an active material for an electrode as the powder and a solution of the thickener as the liquid.

6. The kneading device according to claim 2, further comprising:
a wave generator that applies vibration to the powder so as to supply the powder to the preliminary kneader.

7. The kneading device according to claim 6, further comprising:
a dissolution device that dissolves a thickener in a solvent, wherein
the preliminary kneader kneads at least an active material for an electrode as the powder and a solution of the thickener as the liquid.

8. The kneading device according to claim 2, further comprising:
a dissolution device that dissolves a thickener in a solvent, wherein
the preliminary kneader kneads at least an active material for an electrode as the powder and a solution of the thickener as the liquid.

9. The kneading device according to claim 1, wherein
the main kneader includes: a rotor having a truncated-cone shape, being rotatable about its axis, and being movable in its axial direction; and a container which accommodates the rotor and is provided with an inner peripheral surface having a conical surface that inclines at the same angle as an outer peripheral surface of the rotor,
wherein a second gap between the outer peripheral surface of the rotor and the inner peripheral surface of the container is adjustable by moving the rotor in the axial direction,
wherein the preslurry supplied from the preliminary kneader to a space in the container on a first end-surface side of the rotor is caused to pass through the second gap, whereby the powder is caused to be uniformly dispersed in the preslurry by rotation of the rotor about its axis so as to produce the slurry, and whereby the slurry is extruded to a space in the container on a second end-surface side of the rotor to discharge the slurry outside the container.

10. The kneading device according to claim 9, further comprising:
a wave generator that applies vibration to the powder so as to supply the powder to the preliminary kneader.

11. The kneading device according to claim 9, further comprising:
a dissolution device that dissolves a thickener in a solvent, wherein
the preliminary kneader kneads at least an active material for an electrode as the powder and a solution of the thickener as the liquid.

12. The kneading device according to claim 1, further comprising:
a wave generator that applies vibration to the powder so as to supply the powder to the preliminary kneader.

13. The kneading device according to claim 12, further comprising:
a dissolution device that dissolves a thickener in a solvent, wherein
the preliminary kneader kneads at least an active material for an electrode as the powder and a solution of the thickener as the liquid.

14. The kneading device according to claim 1, further comprising:
a dissolution device including an energy source that dissolves a thickener in a solvent, wherein
the preliminary kneader kneads at least an active material for an electrode as the powder and a solution of the thickener as the liquid.

15. A kneading device comprising:
a preliminary kneader that produces a preslurry by agitating a powder and a liquid introduced therein and wetting the powder with the liquid while transferring the powder and the liquid;
a main kneader that includes two conical surfaces facing each other with a predetermined distance provided therebetween to define a first gap, whereby a slurry is produced by passing the preslurry supplied from the preliminary kneader through the first gap so that the powder is uniformly dispersed in the preslurry, wherein at least one of the two conical surfaces is mounted for rotation about an axis of rotation, and at least one of two conical surfaces is mounted for movement in the direction of the axis of rotation, whereby the two conical surfaces are relatively rotatable about the axis of rotation and whereby the first gap between the two conical surfaces is adjustable;
a slurry discharge passage connected to the main kneader for discharging the slurry from the main kneader;
a valve provided for opening and closing the discharge passage;
a pressure gauge provided to measure the pressure in the main kneader; and
control means for opening and closing the valve responsive to an input from the pressure gauge, such that a viscosity of the slurry is in a predetermined range.

* * * * *